United States Patent [19]

Ferlazzo et al.

[11] 3,925,463

[45] Dec. 9, 1975

[54] PROCESS FOR THE PRODUCTION OF METHYL ACRYLATE

[75] Inventors: Natale Ferlazzo, Milan; Gian Fausto Buzzi, Novara; Marcello Ghirga, Milan, all of Italy

[73] Assignee: Societa' Italiana Resine S.I.R. S.p.A., Milan, Italy

[22] Filed: Nov. 29, 1973

[21] Appl. No.: 420,352

[30] Foreign Application Priority Data

Nov. 30, 1972 Italy................................ 32279/72

[52] U.S. Cl............................ 260/486 R; 252/438
[51] Int. Cl.².......................................... C07C 69/54
[58] Field of Search................................ 260/486 R

[56] References Cited

UNITED STATES PATENTS 3,658,886   4/1972   Sennewald et al............. 260/486 R

*Primary Examiner*—Anton H. Sutto
*Assistant Examiner*—Paul J. Killos
*Attorney, Agent, or Firm*—Sughrue, Rothwell, Mion, Zinn & Macpeak

[57] ABSTRACT

A one step process for the production of methyl acrylate by oxidation of propylene and/or acrolein with oxygen or a gas containing molecular oxygen in the presence of methanol in the vapor phase. The reaction is carried out in the presence of oxidation catalyst known for the oxidation of propylene and/or acrolein to acrylic acid.

16 Claims, No Drawings

PROCESS FOR THE PRODUCTION OF METHYL ACRYLATE

The present invention relates to a process for the production of methyl acrylate by oxidation of propylene or acrolein or mixtures of the two with oxygen or a gas containing molecular oxygen in the presence of methanol.

DESCRIPTION OF THE PRIOR ART

It is known that methyl acrylate is normally prepared by esterification of acrylic acid with excess methanol.

For this purpose, an ion-exchange resin may be used as catalyst, on which the acrylic acid is esterified with a stream of methanol vapor in countercurrent.

Acrylic acid can also be esterified in the liquid phase with sulphuric acid or titanium dioxide as catalyst or in the vapor phase on silica gel.

SUMMARY OF THE INVENTION

An object of the present invention is a process that allows for the production of methyl acrylate directly in a single step from propylene or acrolein or a mixture of the two.

Another object of this invention is in the use of catalysts suitable for carrying out this process.

The present invention is based essentially on the discovery that in the presence of some of the known catalysts for the oxidation of propylene or acrolein or mixtures of the two acrylic acid, propylene or acrolein or the mixture of the two reacts with the methanol and oxygen to form methyl acrylate at high temperatures.

The process of the present invention therefore consists essentially in passing propylene or acrolein or a mixture of propylene and acrolein, together with methanol and oxygen or gases containing molecular oxygen over such catalysts in the gaseous phase and recovering methyl acrylate from the gaseous reaction products.

More particularly, it has been found that the catalysts that can be used for the purposes of the present invention consist of mixtures of antimony and tin oxides containing compounds of iron, vanadium and/or tungsten, or of mixtures of oxides of molybdenum and cobalt, optionally activated with tellurium compounds.

The technique used for the preparation of the catalysts of the invention is not essentially different from that already known for the preparation of the catalysts of the same type used for the oxidation of propylene or acrolein or mixtures of the two to acrylic acid.

Thus, in the case of mixtures of molybdenum and cobalt oxides, an aqueous solution of a cobalt salt is mixed with an aqueous solution or suspension of molybdic acid or of a salt of molybdic acid, ammonia, an ammonium salt or an amine is added, and the mixture is evaporated to dryness and gradually heated to a temperature between about 400 and 800°C, this temperature being maintained for a time of not less than 2 hours.

The addition of ammonia or of an ammonium salt or amine to the preparation adjusts the pH in a range between 3 and 10 in such a way as to give the best activity conditions for the catalyst.

In our case the operation is carried out in such a way as to obtain a catalyst having an atomic ratio of cobalt to molybdenum in the range of from about 0.5/1 to 1/1.

The catalyst may have a tellurium content of up to about 0.5 atoms per atom of molybdenum, which is introduced as telluric acid or as ammonium tellurate in water.

In the case of the catalysts consisting of mixtures of antimony and tin oxides and compounds of iron, one first prepares the solutions of the tin and antimony salts, usually from the finely powdered metals, and a solution of an iron salt, normally the nitrate. The three solutions, to which ammonia, an ammonium salt, and/or an amine may also be added, are mixed at room temperature, and one proceeds substantially as described above for the mixtures of molybdenum and cobalt oxides.

The salts of tin and antimony normally used are the nitrates, which are prepared by attack of a nitric acid solution on finely powdered tin and antimony.

In this case, the operation is carried out in such a way as to obtain a catalyst with an atomic ratio of tin to antimony in the range of from about 0.1/1 to 1/1 and of tin to iron from about 0.5/1 to 2.5/1.

The addition of any other elements, normally in the form of ammonium salts or nitrates of the elements in question, is carried out up to a maximum content of about 0.5 atoms of the elements in question per atom of antimony.

Both the mixtures of molybdenum and cobalt oxides and the mixtures of antimony and tin oxides and iron compounds are then crushed and sieved to obtain dimensions between about 50 and 200 microns.

The catalysts prepared in this way are used for the production of methyl acrylate directly, in a single step in the gaseous phase, by oxidation of propylene or acrolein or a mixture of the two with oxygen or a gas containing molecular oxygen in the presence of methanol, using a conventional technique, such as a fixed-bed or fluidized-bed technique.

In practice, a gaseous mixture in which the molar ratio of propylene or acrolein or the mixture of the two to oxygen has a value in the range from about 0.1/1 to 1/1, while the molar ratio of propylene or acrolein or the mixture of the two to methanol has a value in the range of from about 0.5/1 to 2/1, is fed to the catalyst.

The gaseous mixture normally contains a preponderant quantity, up to 90% by volume, of an inert gas, the said inert gas being chosen from among nitrogen, water, carbon dioxide, rare gases, and the like.

The pressure is normally maintained at atmospheric values, but the operation can also be carried out at up to 5 atm. The temperature, on the other hand, is maintained in the range from about 200° to 450°C, and preferably from about 260° to 350°C.

Under these conditions, the best results are obtained with contact times in the reaction space in the range between 0.1 and 10 seconds, and preferably between about 1 and 6 seconds.

The invention will now be illustrated by the following examples, which are not intended to represent any limitation.

EXAMPLE 1

9.1012 g of ammonium heptamolybdate were dissolved in a 250 ml beaker, and 10 g of cobalt nitrate dissolved in 50 ml of water were then added.

The pH was adjusted to 8–9 by addition of an aqueous ammonia solution having a concentration of 32%, and 3 g of ammonium nitrate were then added.

After evaporation to dryness on a water bath and subsequent drying for 1 hour at 130°C, the activation of the residue was carried out. For this purpose the temperature was gradually raised at a rate of 50°C/hour to 500°C, and this value was maintained for 4 hours.

The catalyst prepared in this way, after crushing and sieving to obtain dimensions between 100 and 150 microns, was charged into a tubular steel reactor having an internal diameter of 8 mm.

The reactor was heated to 300°C by means of an electric resistance placed in a refractory furnace enveloping the tubular reactor.

Using the fixed-bed technique with a contact time of 1.3 seconds, a gaseous mixture consisting (by volume) of 3% of propylene, 3% of acrolein, 3% of methanol, and 8% of oxygen, the remainder consisting of nitrogen, was allowed to flow.

A conversion of 19% was obtained, calculated on propylene and acrolein, with a selectivity of 18% for methyl acrylate.

EXAMPLE 2

4.69 g of finely powdered antimony were dissolved in 40 ml of aqueous nitric acid solution having an acid concentration of 85% at a temperature of about 80°C. 1.14 g of finely powdered tin were dissolved separately in 30 ml of aqueous nitric acid solution with an acid concentration of 85% at a temperature of 80°C. Still separately, 2.31 g of ferrous oxalate were dissolved in 30 ml of a 65% aqueous nitric acid solution at a temperature of 100°C.

The three solutions were mixed at room temperature and the resulting solution was evaporated to dryness on a water bath. Drying was completed at 130°C in an oven for 2 hours, and the activation of the dry residue was then carried out. For this purpose, the temperature was gradually raised at a rate of 50°C/hour to 770°C, and this value was maintained for 2 hours.

The catalyst prepared in this way was crushed and sieved to separate the fraction having diameters between 50 and 200 microns.

This fraction was charged into a steel reactor having an internal diameter of 8 mm.

Using the fixed bed technique with a contact time of 5 seconds and a temperature of 290°C, a gaseous mixture consisting, by volume, of 4% of acrolein, 3% of methanol, and 10% of oxygen, the remainder consisting of nitrogen, was allowed to flow.

Under these conditions, the acrolein was converted to an extent of 23.85% with a selectivity of 16% for methyl acrylate.

EXAMPLE 3

Using the catalyst prepared as in Example 2 and with the same gaseous composition as in Example 2, but with a temperature of 250°C and a contact time of 5.8 seconds, a conversion of 8.25% of the acrolein introduced was obtained with a selectivity of 21.3% for methyl acrylate.

EXAMPLE 4

10.029 g of finely powdered antimony were dissolved in 100 ml of an aqueous nitric acid solution having an acid concentration of 85% at a temperature of 80°C.

2.50 g of finely powdered tin were dissolved separately in 70 ml of 85% aqueous nitric acid solution at a temperature of 80°C.

Still separately, 5,07 g of ferrous oxalate were dissolved in 50 ml of 65% aqueous nitric acid solution at a temperature of 100°C.

The three solutions were mixed at room temperature, and a solution of 2.47 g of ammonium vanadate in 50 ml of water was added to the new solution obtained.

The resulting solution was evaporated to dryness on a water bath, and drying of the residue was completed in an oven for 2 hours at 130°C.

The activation of the dry residue was then carried out.

For this purpose, the temperature was gradually raised at a rate of 50°C/hour to 770°C, and this value was maintained for 2 hours.

The catalyst prepared in this way was crushed and sieved to separate the fraction having diameters from 100 to 150 microns.

This fraction was charged into a steel reactor having an internal diameter of 8 mm.

Using the fixed-bed technique with a contact time of 9 seconds and a temperature of 281°C, a gaseous mixture consisting, by volume, of 3.05% of acrolein, 3% of methanol, and 10% of oxygen, the remainder consisting of nitrogen, was allowed to flow.

Under these conditions, the conversion of acrolein was 13.31% with a selectivity of 26.9% for methyl acrylate.

EXAMPLE 5

Using a catalyst prepared as in Example 4 and with the same gaseous composition as in Example 4, but with a temperature of 292°C and a contact time of 2.2 seconds, a conversion of 6.6% of the acrolein introduced was obtained with a selectivity of 33% for methyl acrylate.

What we claim is:

1. Process for the production of methyl acrylate, which consists of contacting a gaseous stream containing at least one unsaturated compound selected from the group consisting of propylene and acrolein together with methanol and an oxidizing agent selected from the group consisting of molecular oxygen and gases containing molecular oxygen with an oxidation catalyst selected from the group comprising:

mixtures of antimony and tin oxides containing compounds of iron, vanadium and/or tungsten, or mixtures of oxides of molybdenum and cobalt, optionally activated with tellurium compounds, wherein the molar ratio of the unsaturated compound or compounds to oxygen is in the range of from about 0.1/1 to 1/1, while the molar ratio of the unsaturated compound to methanol is in the range of from about 0.5/1 to 2/1 and wherein the operation is carried out at a temperature in the range of from about 200° to 450°C., at a pressure of from about 1 to 5 atmospheres and wherein a contact time of from 0.1 to 10 seconds is employed and subsequently recovering methyl acrylate from the gaseous reaction products.

2. Process for the production of methyl acrylate, which consists of contacting a gaseous stream containing at least one usaturated compound selected from the group consisting of propylene and acrolein together with methanol and an oxidizing agent selected from the group consisting of molecular oxygen and gases containing molecular oxygen with an oxidation catalyst suitable for the oxidation of an unsaturated compound selected from the group of propylene and acrolein to acrylic acid and recovering methyl acrylate from the gaseous reaction products.

3. Process according to claim 2, characterized in that a gaseous stream in which the molar ratio of the unsaturated compound or compounds to oxygen is in the range of from about 0.1/1 to 1/1, while the molar ratio of the unsaturated compound or compounds to methanol is in the range of from about 0.5/1 to 2/1, is brought into contact with the oxidation catalyst.

4. Process according to claim 3, characterized in that the operation is carried out at a temperature in the range of from about 200° to 450°C, at a pressure of from about 1 to 5 atm. and with a contact time of from 0.1 to 10 seconds.

5. Process according to claim 4, characterized in that the operation is carried out at a temperature between about 260° and 350°C.

6. Process according to claim 5, characterized in that the operation is carried out with a contact time of from about 1 to 6 seconds.

7. Process for the production of methyl acrylate which consists of contacting a gaseous stream containing at least one unsaturated compound selected from the group consisting of propylene and acrolein together with methanol and an oxidizing agent selected from the group consisting of molecular oxygen and gases containing molecular oxygen with an oxidation catalyst consisting essentially of molybdenum and cobalt oxides, the atomic ratio of cobalt to molybdenum being in the range of from about 0.5/1 to 1/1, and optionally tellurium compounds, in an atomic ratio of tellurium to molybdenum of up to about 0.5/1, and recovering methyl acrylate from the gaseous reaction products.

8. Process according to claim 7, characterized in that a gaseous stream in which the molar ratio of the unsaturated compound or compounds to oxygen is in the range of from about 0.1/1 to 1/1, while the molar ratio of the unsaturated compound or compound to methanol is in the range of from about 0.5/1 to 2/1, is brought into contact with the oxidation catalyst.

9. Process according to claim 8, characterized in that the operation is carried out at a temperature in the range of from about 200° to 450°C, at a pressure of from about 1 to 5 atm, and with a contact time of from 0.1 to 10 seconds.

10. Process according to claim 9, characterized in that the operation is carried out at a temperature between about 260° and 350°C.

11. Process according to claim 10, characterized in that the operation is carried out with a contact time of from about 1 to 6 seconds.

12. Process for the production of methyl acrylate which consists of contacting a gaseous stream containing at least one unsaturated compound selected from the group consisting of propylene and acrolein together with methanol and an oxidizing agent selected from the group consisting of molecular oxygen and gases containing molecular oxygen with an oxidation catalyst consisting essentially of antimony and tin oxides and iron compounds, the atomic ratio of tin to antimony being in the range of from about 0.1/1 to 1/1 and the atomic ratio of tin to iron being in the range of from about 0.5/1 to 2.5/1, and optionally vanadium and/or tungsten compounds in an atomic ratio of these elements to antimony of up to about 0.5/1, and recovering methyl acrylate from the gaseous reaction products.

13. Process according to claim 12, characterized in that a gaseous stream in which the molar ratio of the unsaturated compound or compounds to oxygen is in the range of from about 0.1/1 to 1/1, while the molar ratio of the unsaturated compound or compounds to methanol is in the range of from about 0.5/1 to 2/1, is brought into contact with the oxidation catalyst.

14. Process according to claim 13, characterized in that the operation is carried out at a temperature in the range of from about 200° to 450°C, at a pressure of from about 1 to 5 atm, and with a contact time of from 0.1 to 10 seconds.

15. Process according to claim 14, characterized in that the operation is carried out at a temperature between about 260° and 350°C.

16. Process according to claim 15, characterized in that the operation is carried out with a contact time of from about 1 to 6 seconds.

* * * * *